United States Patent [19]

Husbands

[11] 4,294,508
[45] Oct. 13, 1981

[54] OPTICAL MULTIPLEXER/DEMULTIPLEXER

[75] Inventor: Charles R. Husbands, Acton, Mass.

[73] Assignee: The United States of America as represented by the Secretary of the Air Force, Washington, D.C.

[21] Appl. No.: 68,822

[22] Filed: Aug. 22, 1979

[51] Int. Cl.³ .............................................. G02B 5/14
[52] U.S. Cl. .................................. 350/96.15; 250/227
[58] Field of Search .................. 350/96.15, 96.16, 169; 250/227

[56] References Cited

U.S. PATENT DOCUMENTS

| | | | |
|---|---|---|---|
| 3,405,994 | 10/1968 | Altman et al. | 350/50 X |
| 3,617,109 | 11/1971 | Tien | 350/96.15 |
| 3,777,149 | 12/1973 | Marcatili | 350/96.15 |
| 3,908,121 | 9/1975 | Riseberg et al. | 250/199 |
| 3,913,872 | 10/1975 | Weber | 240/41 R |

OTHER PUBLICATIONS

Wale Tomlinson, "Wavelength Multiplexing in Multi-mode Optical Fibers," W. J. Tomlinson, Applied Optics, vol. 16, #8, 8/1977, pp. 2180-2194.

*Primary Examiner*—John K. Corbin
*Assistant Examiner*—Rodney Bovernick
*Attorney, Agent, or Firm*—Donald J. Singer; Jacob N. Erlich

[57] ABSTRACT

An optical multiplexer/demultiplexer having a body made up of a pair of reflective and a pair of non-reflective sides. As a demultiplexer a beam containing a plurality of optical wavelengths is separated within the body into its constituent wavelengths utilizing the principles of optical refraction and optical reflection. By extending the length of the body, sufficient physical separation can be realized between each of the constituent wavelengths to allow detection of each wavelength by spacially separated detectors. As a multiplexer a plurality of beams, each having a single wavelength, are combined to provide a single output beam having a plurality of wavelengths contained therein.

17 Claims, 4 Drawing Figures

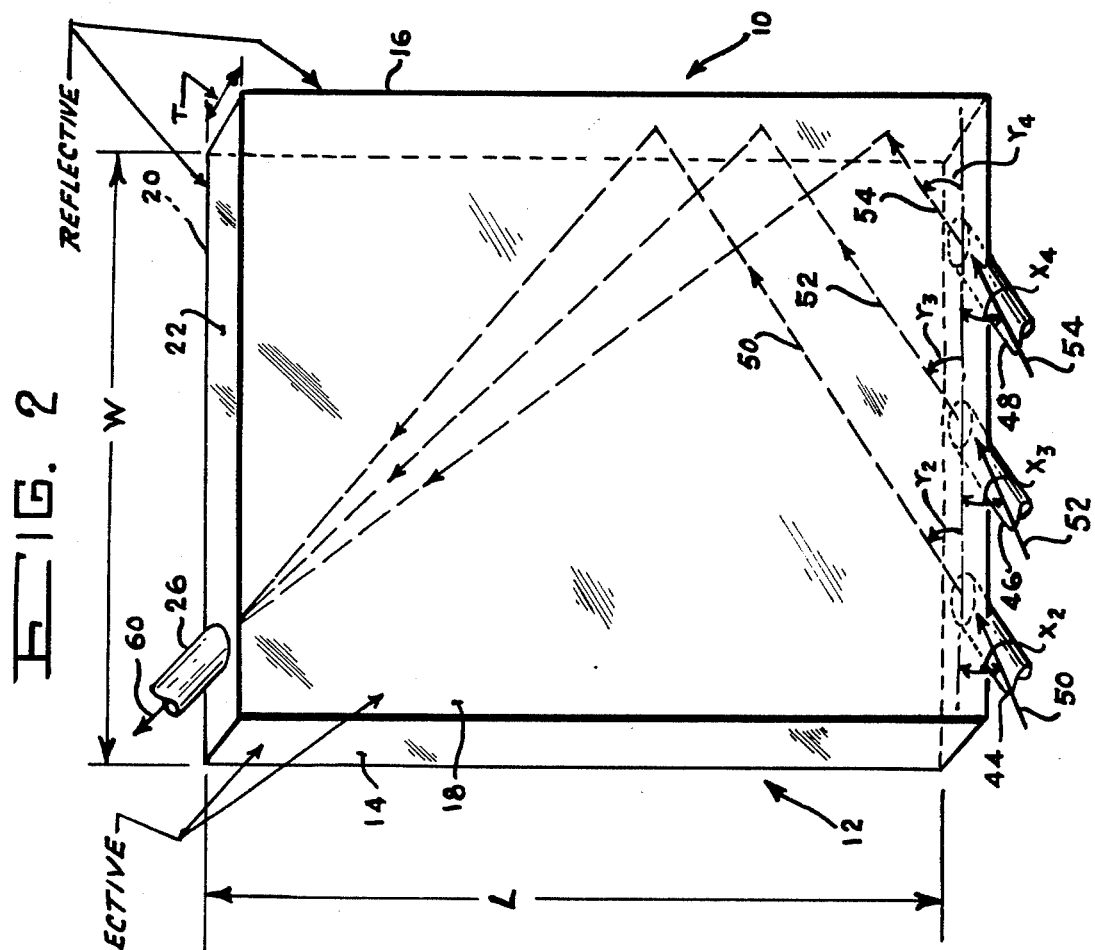
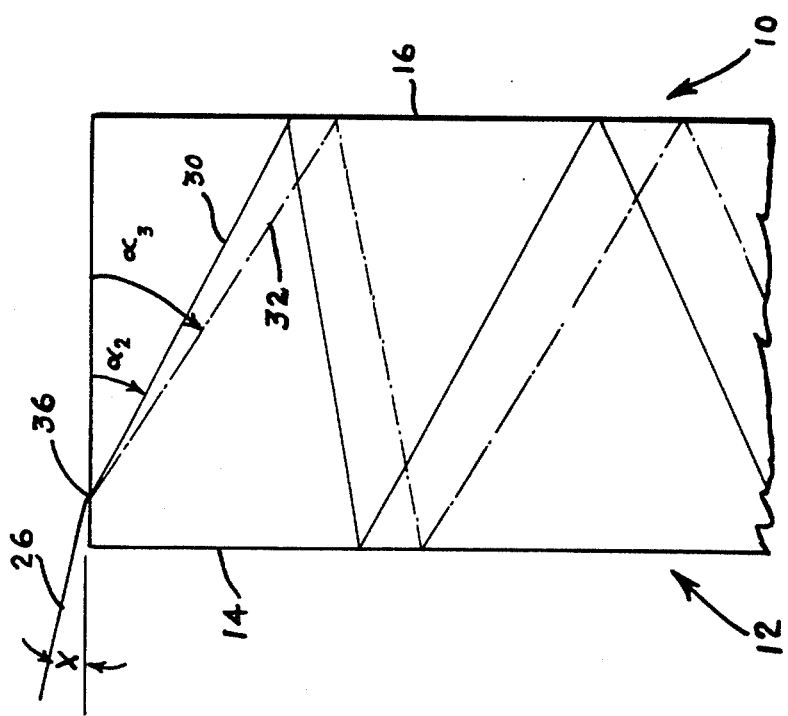

OPTICAL MULTIPLEXER/DEMULTIPLEXER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to multiplexing systems, and, more particularly, to an improved optical multiplexer/demultiplexer.

In practice, the need frequently arises for communications or reconnaissance systems which simultaneously convey multiple messages from a large number of information sources in one location to a large number of users at another location. Multiplexing systems economically meet this need by combining the messages from several information sources, which are then transmitted as a composite group over a single transmission facility, with provision at the receiver for separation (demultiplexing) back to individual messages.

In recent years with the development and implementation of fiber optic technology into practical transmission systems a great deal of attention has been given to a multiple carrier technique referred to as wavelength division multiplexing (WDM). This technique, which is the optical equivalent of frequency division multiplexing technique employed in RF coaxial transmission networks, can be used to increase the information transfer capacity of the medium. In the wavelength division multiplexing technique each discrete data channel is modulated onto an optical carrier of a fixed wavelength. Each of the individual carriers are then superimposed onto the optical transmission medium. At the optical receiver the individual carrier must be reestablished by filtering the composite carrier into its individual wavelength components.

One of the parameters that encourages the development of wavelength division multiplexing is the inherent narrow spectral characteristics of optical sources. The basic problem in developing this technique is the broad spectral response of the available photodetector unit. In order to successfully employ these photodetector units in a wavelength division multiplexing system the photodetector must be preceded by some form of selective optical filtering.

To achieve the desired optical filtering to make wavelength division multiplexing practical, a series of optical techniques have been examined. Some of these techniques employ prisms, blazed plane reflection gratings, simple thick reflection gratings, multiple thick reflection gratings, simple thick transmission gratings and dicromatic coatings. An article of particular interest which describes and compares these techniques is "Wavelength Multiplexing in Multimode Optical Fibers", by W. J. Tomlinson, Applied Optics, Vol. 16, No. 8, ppgs 2180-2194, August 1977.

Unfortunately, size is a critical requirement when providing selective optical filtering. To date, however, multiplexing systems of the past have been either unreliable in complete separation of the individual wavelength components or are of such a large size as to provide an overall system which is incompatible with the desired small size requirements.

SUMMARY OF THE INVENTION

The instant invention overcomes the problems set forth hereinabove by providing an optical multiplexer/demultiplexer which is capable of achieving the required path separation within a small physical space by folding the optical path of a beam or beams of radiant energy using the principle of total internal reflection.

The multiplexer/demultiplexer of this invention finds its main utility as a wavelength division demultiplexer for separating an optical carrier containing information at a plurality of optical wavelengths into its constituent components. However, it should be realized, that although the description of this invention set forth hereinbelow is primarily directed to the demultiplexer operation, this invention also operates as a multiplexer when the demultiplexer operation is reversed. In such a case, a plurality of input beams, each having a separate preselected wavelengths, are combined to form a single output beam containing a plurality of wavelengths therein.

The multiplexer/demultiplexer of this invention utilizes the principle of optical refraction in combination with the principle of total internal reflection in order to achieve the required path separation of various beams of radiant energy of different wavelengths within a small physical area. The body of the multiplexer/demultiplexer of this invention is generally made of a solid material having a preselected index of refraction, the material preferably being glass. If, however, other indices of refraction are desired other materials may be utilized or the body may take the form of a thin walled container designed to hold a liquid or gas.

All the surfaces of the body, with the exception of a pair of opposed input and output sides are coated with a highly reflective substance. This reflective substance, such as an evaporated film of silver, is designed to provide total internal reflection within the body. In the case of the demultiplexer mode of operation of this invention optical energy in the form of a single beam of radiant energy containing a plurality of wavelengths is introduced into the body either directly, as with a collimated optical beam of radiant energy or by means of an optical fiber attached to the top surface of the body. The angle at which this beam of radiant energy is introduced into the body is extremely critical since it determines the amount of separation of various beams of radiant energy of different wavelengths within the body. The angle of the separation of the different wavelengths in conjunction with the specific overall dimensions of the body are utilized in a final determination of the separation of these beams at different wavelengths for subsequent detection at the output end of the multiplexer/demultiplexer of this invention.

In order to achieve the described physical separation between the beams of radiant energy at different wavelengths relatively long optical path lengths were generally required. However, with the instant invention to achieve physically long optical path lengths in a physically small body, the optical paths are folded through the use of total internal reflection. In fact, in practice the multiplexer/demultiplexer of this invention may require hundreds of internal reflections in order to accomplish the desired separation of wavelengths.

During demultiplexer operation, when a single beam of radiant energy having a plurality of wavelengths enters the body of the multiplexer/demultiplexer of this invention, the refraction angle of the input beam will be altered in compliance with Snell's Law. As each of the wavelengths of the input beam have a slightly different index of refraction within the body, the input beam at a preselected input angle, will be decomposed into several beams, each containing a different wavelength. Each of the beams within the body will have a corresponding angle established by the index of refraction outside the body, the input angle, and the index of refraction of the wavelength of interest within the body. Therefore, with knowledge of the input angle, the various angles of the several beams within the body can be determined. Once this determination has been made and a desired separation of the output wavelengths determined, a specific length and width for the body can be constructed by the use of appropriate conventional geometric techniques in order to provide for such separation.

Although many input angles can be utilized with this invention it is essential for operation of this invention that the input angle be situated somewhere between the angle of total reflection and total refraction. As stated hereinabove, the above description was made with respect to the demultiplexer mode of operation, however, a reversal of operation easily transforms the multiplexer/demultiplexer of this invention into the multiplexer mode of operation.

It is therefore an object of this invention, to provide an optical multiplexer/demultiplexer which is capable of separating a plurality of beams of radiant energy of different wavelengths within in a small physical area.

It is another object of this invention, to provide a multiplexer/demultiplexer which is made of a non-delicate, rigid structure.

It is still another object of this invention to provide a multiplexer/demultiplexer which operates at extremely low loss.

It is a further object of this invention to provide an optical multiplexer/demultiplexer which will operate reliably with a multi-mode optical fiber system.

It is still a further object of this invention to provide an optical multiplexer/demultiplexer which is economical to produce and which utilizes conventional, currently available components that lend themselves to standard, mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWINGS

FIG. 2 is a schematic, pictorial representation of the multiplexer/demultiplexer of this invention in the multiplexer mode of operation;

FIG. 3 is a schematic representation of the multiplexer/demultiplexer of this invention showing the various folded paths of radiant energy within the body.

DETAILED DESCRIPTION OF THE PREFERRED EMBODIMENT

Figure 1:
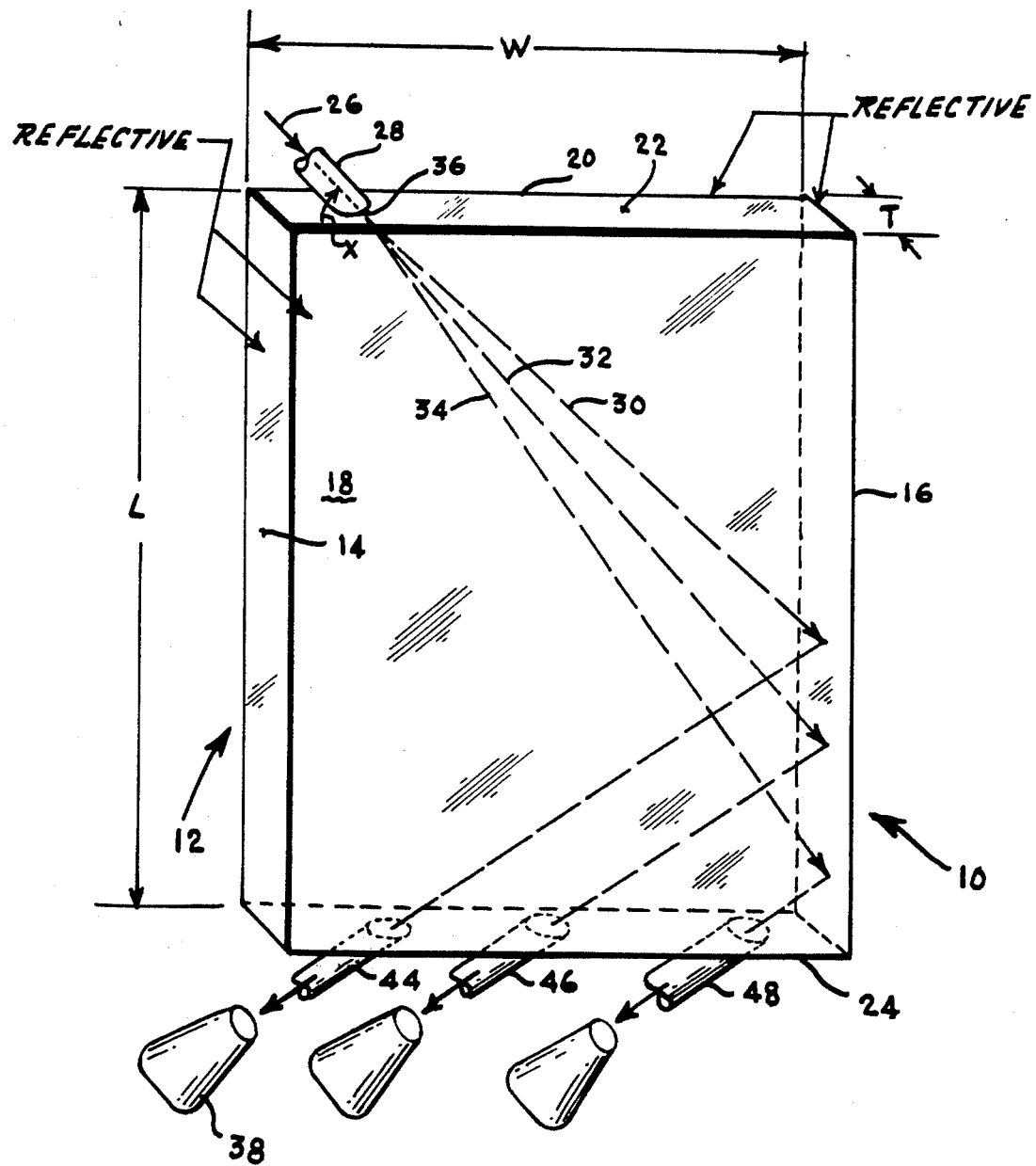
FIG. 1 represents a schematic, pictorial representation of the multiplexer/demultiplexer of this invention shown in the demultiplexer mode of operation.

Reference is now made to FIG. 1 of the drawing which pictorially represents in schematic fashion the multiplexer/demultiplexer 10 of this invention in the demultiplexer mode of operation. Although the detailed description set forth hereinbelow will primarily refer to the multiplexer/demultiplexer shown in FIG. 1 of the drawing, the multiplexer mode of operation is illustrated in FIG. 2 of the drawing, in which identical numerals are utilized to identify the identical elements set forth both in FIGS. 1 and 2 of the drawing.

Multiplexer/demultiplexer 10 is made up of a body 12 having a width W, a length I , and a thickness T. Body 12 may be made either of a solid material such as glass or may be in the form of a thin walled container designed to hold a liquid or gas therein. The configuration of body 12, although not limited thereto, is generally rectangular in shape with surfaces 14, 16, 18 and 20 being coated with a highly reflective material such as silver while the top and bottom surfaces 22 and 24 are transparent. The reflective material is designed to provide total internal reflection within body 10 in a manner to be described in detail hereinbelow while surfaces 22 and 24 provide for the input and output surfaces of multiplexer/demultiplexer 10 of this invention.

For a proper understanding of the operation of multiplexer/demultiplexer 10 of this invention utilized as a demultiplexer, reference is still made to FIG. 1 of the drawing. Optical energy, in the form of, for example, a beam of radiant energy 26 is provided by any suitable source such as a laser (not shown). Beam 26 is introduced into surface 22 of body 12 at a preselected angle X. This beam of radiant energy 26 is introduced either directly into surface 22, as with a collimated optical beam of radiant energy or by means of any conventional optical fiber 28. In the case of the optical fiber 28, fiber 28 is secured by any conventional securing means such as epoxy at preselected angle X to surface 22 of body 12. In demultiplexer operation radiant energy beam 26 contains a plurality of wavelengths (three being displayed with respect to FIG. 1). Beam 26 is divided as a result of the refractive quality of body 12 into a plurality of beams 30, 32 and 34 within body 12, each of the beams 30, 32 and 34 containing one of the wavelengths, respectively.

However, for simplicity, although beam 26 can contain any number of wavelengths, only two such wavelengths, represented by beams 30 and 32 are depicted in FIG. 3 of the drawing. For the analysis presented hereinbelow it is assumed that the composite signal entering as beam 26 is collimated and that there is no spreading of the optical energy at the entrance point 36. The external refractive index for the the two wavelengths is designated as N1 with input beam 26 being introduced into surface 22 at angle X. The refractive index, NA, inside body 12 of the multiplexer/demultiplexer 10 of this invention is dependent upon the material of which body 12 is made. For example, for one wavelength the refractive index will be designated as N2 while for the other wavelength the refractive index is designated N3. Due to Snell's Law, the two wavelengths will be bent to slightly different angles $\alpha_2$ and $\alpha_3$, respectively, inside body 12 of multiplexer/demultiplexer 10 based on the relationship between the internal and external refractive indices and the incident angle of radiation X.

As a result of the reflectivity of the two opposed sides 14 and 16 of body 12, the path lengths of beams 30, 32 (and 34) are lengthened by a reflective process. At each successive reflective point on surfaces 14 and 16 of body 12 separation between beams 30 and 32 are increased as clearly shown in FIG. 3 of the drawing. Therefore, if the input angle, X, is known and as long as this input angle X is somewhere between the angle of complete reflection and the angle of complete refraction, angle $\alpha_2$, and $\alpha_3$ of beams 30 and 32, respectively, can be derived from the following equation:

$$\alpha = \sin^{-1}(N1/NA \sin X)$$

with N1 representative of the external index of refraction and NA the index of refraction of body 10 at a particular wavelength of interest.

By conventional geometric calculations the determination of $\alpha_2$, and $\alpha_3$ will subsequently allow for the proper sizing of body 12 as described in detail hereinbelow with respect to FIG. 4 of the drawing for the appropriate separation between output beams 30 and 32 through surface 24.

The output beams 30, 32 (and 34), each having a respective wavelength associated therewith is detected at surface 24 by any suitable detectors 38, 40 and 42 such as standard PIN photodetectors as shown in FIG. 2. Detection is accomplished either directly or by means of a respective optical fiber 44, 46 and 48 associated with surface 24 of body 12 and optically interposed between surface 24 and detectors 38, 40 and 42, respectively.

As each of the individual carrier wavelengths travel through body 12 by means of respective beams 30, 32 and 34 physical separation thereof is accomplished by the folded optical path through the use of internal reflection. Although FIG. 1 of the drawing illustrates only one reflection and FIG. 3 illustrates three reflections, in practice, multiplexer/demultiplexer 10 of this invention may require as many as 100 reflections for the appropriate separation between the various output beams within the appropriate body configuration.

As with any demultiplexer device a measure of quality of performance is adjacent channel cross talk. This phenomena occurs because of a lack of adequate separation between the desired signal and the information impressed on the other channel. In multiplexer/demultiplexer 10 of this invention, the channel separation function is achieved by optical refraction. As the angular displacement between channel is proporational to the index of refraction of the material of the body 12 of multiplexer/demultiplexer 10 at the wavelength of concern, the greater the relative index of refraction value the greater channel separation. Folding the optical path through total internal reflection allows the placement of the detectors 38, 40 and 42 to be optimized but will not reduce the interchannel cross talk.

Reference is now made to FIG. 2 of the drawing which best illustrates the multiplexer/demultiplexer 10 of this invention in the multiplexer mode of operation. In this mode of operation a plurality (three being shown in FIG. 2) of input beams 50, 52 and 54, with each input beam having its own preselected wavelength is input at angles $X_2$, $X_3$ and $X_4$, respectively, such that the paths formed by these beams 50, 52 and 54 within body 12 follow the paths represented by beams 30, 32, and 34 of FIG. 1. At surface 22, the output beams 50, 52 and 54 are combined to produce a single output beam 60 containing all three wavelengths. In the multiplexer mode of operation for multiplexer/demultiplexer 10, a specific known angle $\gamma_2$, $\gamma_3$ and $\gamma_4$ is desired within body 12. Consequently, the following equation:

$$X = \sin^{-1}(NA/N1 \sin\gamma)$$

is utilized to provide the unknown input angles $X_2$, $X_3$ or $X_4$. As with the configuration shown in FIG. 1 of the drawing input beams 50, 52 and 54 may be directly input into surface 24 of multiplexer/demultiplexer 10 or may be fed into surface 24 by means of conventional fiber optic elements 44, 46 and 48.

OPERATIVE EXAMPLE

Figure 4:
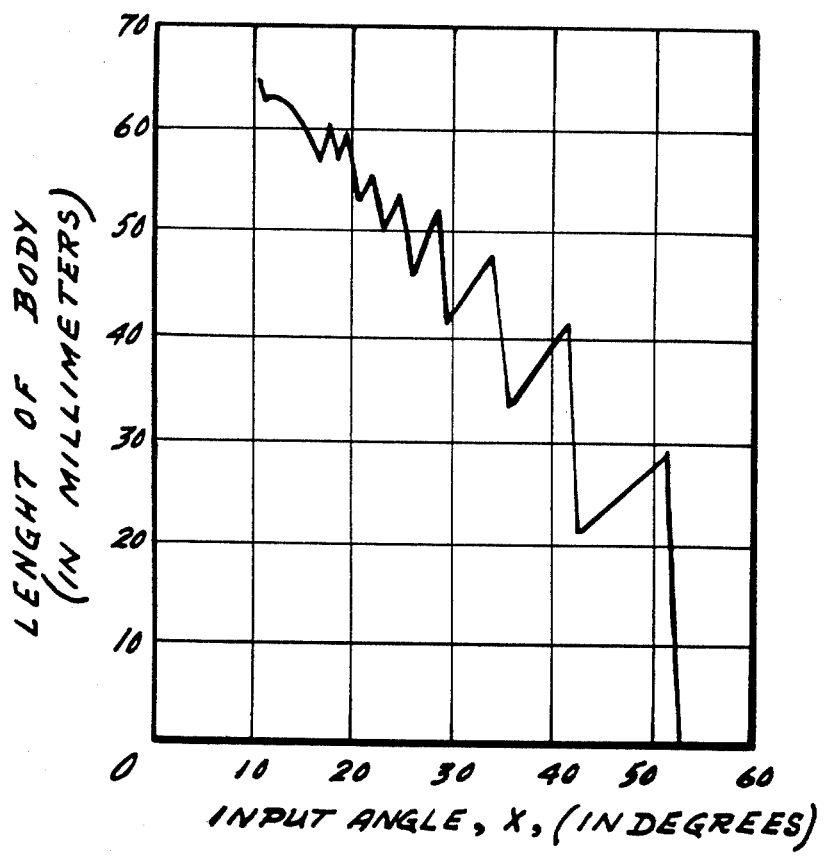
FIG. 4 is a graph representing a plot of length versus input angle of the multiplexer/demultiplexer of this invention.

In the demultiplexer mode of operation for multiplexer/demultiplexer 10 of this invention, a plot of the length, L, of body 12 of multiplexer/demultiplexer 10 of this invention is shown in FIG. 4 of the drawing for a desired output separation of, for example, 200 microns at surface 24. This plot of L is based upon a body 12 made of Borosilicate Crown Glass having a width of 1 inch (25.4 millimeters). The composite wavelengths chosen are 6563 Å and 5893 Å. Determination of refracted angles $\alpha_2$ and $\alpha_3$ of beams 30 and 32, respectively, as shown in FIG. 3 of the drawing were derived by use of the equation $\alpha = \sin^{-1}(N1/NA \sin X)$ where N1 is the external index of refraction, NA is the index of the refraction of Borosilicate Glass at each of the wavelengths of interest and X is the known input angle of beam 26. With angles X, $\alpha_2$, $\alpha_3$, width, W, and the desired output separation known, appropriate conventional geometric calculations can determine L, which is shown, in FIG. 4, at varying input angles X. It is interesting to note that the required length, L, of body 12 of the multiplexer/demultiplexer 10 of this invention does not change as a function of the width. By doubling the width, W, of body 12 it takes only half as many reflections to reach the same separation point but the same length, L, is still required.

Although this invention has been described with reference to a particular embodiment, it will be understood to those skilled in the art that this invention is also capable of further and other embodiments within the spirit and scope of the appended claims.

I claim:

1. An optical multiplexer/demultiplexer comprising a body having a preselected index of refraction, said body having a pair of reflective sides and a pair of non-reflective sides, means associated with one of said non-reflective sides for directing a single beam of radiant energy at a predetermined angle with respect to said one non-reflective side into or out of said body, said single beam of radiant energy containing at least two preselected wavelengths, means associated with the other of said non-reflective sides for directing at least two beams of radiant energy, each at predetermined angles with respect to said other non-reflective side into or out of said body, each of said two beams of radiant energy containing only one of said preselected wavelengths, respectively, said two beams of radiant energy being spaced apart a preselected distance along said other non-reflective side, and each of said predetermined angles lying between angles of complete refraction and complete reflection, whereby when said single beam of radiant energy is directed into said body through said one non-reflective side, said multiplexer/demultiplexer operates as a demultiplexer with said single beam of radiant energy being separated within said body into said two beams of radiant energy, each of said two beams containing only one of said preselected wavelengths, respectively, said two beams reflecting off at least one of said reflective sides of said body before being output from said other non-reflective side, and when said two beams of radiant energy are directed into said body through said other non-reflective side, said multiplexer/demultiplexer operates as a multiplexer with said two beams of radiant energy being reflected off at least one of said reflective sides of said body and combining into said single beam of radiant energy at said one non-reflective side of said body before being output therefrom.

2. An optical multiplexer/demultiplexer as defined in claim 1 wherein said body is of a predetermined length, said predetermined length being functionally related to said predetermined angles and said preselected spaced apart distance of said two beams of radiant energy.

3. An optical multiplexer/demultiplexer as defined in claim 1 wherein said pair of reflective sides are parallel.

4. An optical multiplexer/demultiplexer as defined in claim 3 wherein said pair of non-reflective sides are parallel.

5. An optical multiplexer/demultiplexer as defined in claim 1 wherein said means for directing a single beam of radiant energy into or out of said body is an optical fiber, said optical fiber being operably associated with said one non-reflective side.

6. An optical multiplexer/demultiplexer as defined in claim 1 wherein said means for directing at least two beams of radiant energy into or out of said body comprises at least two optical fibers, each of said optical fibers being operably associated with said other non-reflective side and spaced said preselected distance apart from each other.

7. An optical demultiplexer comprising a body having a preselected index of refraction, said body having a pair of reflective sides and a pair of non-reflective sides, means associated with one of said non-reflective sides for directing a single beam of radiant energy at a predetermined angle with respect to said one non-reflective side into said body, said single beam of radiant energy containing at least two preselected wavelengths, means associated with the other of said non-reflective sides for directing at least two beams of radiant energy, each at predetermined angles with respect to said other non-reflective side, out of said body, each of said two beams of radiant energy containing only one of said preselected wavelengths, respectively, said two beams of radiant energy being spaced apart a preselected distance along said other non-reflective side, and each of said predetermined angles lying between angles of complete refraction and complete reflection, whereby said single beam of radiant energy is separated within said body into said two beams of radiant energy, each of said two beams containing only one of said preselected wavelengths, respectively, and said two beams reflecting off at least one of said reflective sides of said body before being output from said other non-reflective side.

8. An optical demultiplexer as defined in claim 7 wherein said pair of reflective sides are parallel.

9. An optical demultiplexer as defined in claim 8 wherein said pair of non-reflective sides are parallel.

10. An optical demultiplexer as defined in claim 7 wherein said means for directing a single beam of radiant energy into said body is an optical fiber, said optical fiber being operably associated with said one non-reflective side.

11. An optical demultiplexer as defined in claim 7 wherein said means for directing at least two beams of radiant energy out of said body comprises at least two optical fibers, each of said optical fibers being operably associated with said other non-reflective side and spaced said preselected distance apart from each other.

12. An optical demultiplexer as defined in claim 7 further comprising means for detecting each of said beams of radiant energy output from said body.

13. An optical multiplexer comprising a body having a preselected index of refraction, said body having a pair of reflective sides and a pair of non-reflective sides, means associated with one of said non-reflective sides for directing at least two beams of radiant energy, each at predetermined angles with respect to said one non-reflective side into said body, each of said two beams of radiant energy containing only one preselected wavelength, said two beams of radiant energy being spaced apart a preselected distance along said one non-reflective side, means associated with the other of said non-reflective sides for directing a single beam of radiant energy at a predetermined angle with respect to said other non-reflective side out of said body, said single beam of radiant energy containg at least two preselected wavelengths, and each of said predetermined angles lying between angles of complete refraction and complete reflection, whereby said two beams of radiant energy are reflected off at least one of said reflective sides of said body and combine into said single beam of radiant energy containing said two preselected wavelengths at said other non-reflective side of said body before being output therefrom.

14. An optical multiplexer as defined in claim 13 wherein said pair of reflective sides are parallel.

15. An optical multiplexer as defined in claim 14 wherein said pair of non-reflective sides are parallel.

16. An optical multiplexer as defined in claim 13 wherein said means for directing a single beam of radiant energy out of said body is an optical fiber, said optical fiber being operably associated with said other non-reflective side.

17. An optical multiplexer as defined in claim 13 wherein said means for directing at least two beams of radiant energy into said body comprises at least two optical fibers, each of said optical fibers being operably associated with said one non-reflective side and spaced said preselected distance apart from each other.

* * * * *